Feb. 27, 1951        A. RANCOURT        2,543,507
CLOTH ROLL
Filed June 23, 1949
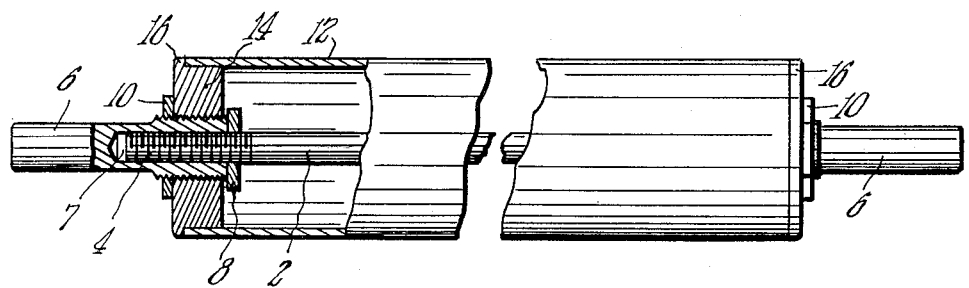
INVENTOR.
Alphonse Rancourt.
BY Ross & Ross

UNITED STATES PATENT OFFICE 2,543,507

CLOTH ROLL

Alphonse Rancourt, Pittsfield, Mass.

Application June 23, 1949, Serial No. 100,920

1 Claim. (Cl. 242—68)

This invention relates to spool construction and is directed more particularly to a fabricated spool.

The principal object of the invention is directed to the provision of a spool construction where the components are easily and readily assembled and disassembled.

When the components are assembled the structure is strong and rigid and the construction facilitates economical manufacture which is desirable.

While the structure is strong and rigid it is at the same time light in weight by reason of its novel construction.

The spool is adapted for many and various uses but is particularly adapted for use in the textile industry where webs of fabric are wound on rolls and transferred from one roll to another in the various processes.

With the foregoing and various other novel features and advantages and other objects of my invention as will become more apparent as the description proceeds, the invention consists in certain novel features of construction and in the combination and arrangement of parts as will be hereinafter more particularly points out in the claim hereunto annexed and more fully described and referred to in connection with the accompanying drawings wherein the figure is a combined side elevational and longitudinal view of a roll embodying the novel features of the invention.

Referring now to the drawing more in detail, the invention will be fully described.

A central tension or tie rod 2 is provided which will have substantial tensile strength and may be made from metal such as steel or the like. Opposite ends of the rod 2 are provided with screw threads as at 4.

Trunnion members 6 are provided which have threaded sockets 7 for threadedly engaging the threaded ends 4 of the rod 2.

Inner lock nuts 8 are provided for engaging the threaded ends 4 of the rod 2.

Inner ends of the members 6 are provided with external screw threads, as shown, and outer lock nuts 10 are in threaded engagement therewith.

A tubular shell 12 which may be formed from metal is provided and its opposite ends are closed by end heads 14 which are in threaded engagement with the threaded portions of the trunnion members 6.

The heads 14 are arranged to extend into the ends of the shell 12 and have annular lips 16 for abutting the ends of said shell.

In assembling the components the trunnion members are screwed onto the opposite ends of the central rod 2 and are locked thereon by jamming the nuts 8 against inner ends of said trunnion members.

The end members 14 are screwed onto trunnion members so as to enter into the opposite ends of the member 12 with the lips 16 thereof tightly engaging the ends of the shell.

The lock nuts 10 are then jammed against members 14 to lock them in place on members 6.

It will bo observed that the parts are readily and easily asembled to provide a strong rigid roll which is light in weight and adapted for long life.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A spool construction comprising in combination, an elongated central rod having its opposite ends provided with screw threads, end trunnions having screw threaded sockets extending inwardly from adjacent inner ends thereof threadedly receiving the opposite threaded ends of said rod, inner lock nuts threadedly engaging opposite ends of said rod in abutment with inner adjacent ends of said trunnions locking said trunnions and rod, against relative rotative movements, said trunnions having external screw threads and axially aligned outwardly extending trunnion portions, end heads in threaded engagement with the external screw threads of said trunnions having inner annular portions and annular lips disposed outwardly thereof, a tubular shell concentrically related to said rod having end portions receiving the inner annular portions of said trunnions and opposite ends against the lips thereof, the outer peripheries of said shell and lips being in substantial alignment, and outer lock nuts on the external screw threads of said trunnions abutting outer sides of said end heads locking said trunnions and end heads against relative rotation.

ALPHONSE RANCOURT.

REFERENCES CITED

The following references are of record in the file of this patent:

UNITED STATES PATENTS

| Number | Name | Date |
|---|---|---|
| 2,304,922 | Hosfield | Dec. 15, 1942 |

FOREIGN PATENTS

| Number | Country | Date |
|---|---|---|
| 7,229 | Great Britain | Mar. 18, 1915 |